United States Patent [19]
Boden

[11] 3,739,655
[45] June 19, 1973

[54] VECTOR FORCE-BALANCING MECHANISMS

[75] Inventor: Peter Standidge Boden, Harpenden, England

[73] Assignee: Kent Instruments Limited, Luton, Bedfordshire, England

[22] Filed: Sept. 24, 1971

[21] Appl. No.: 183,353

[30] Foreign Application Priority Data
Sept. 28, 1970 Great Britain.................. 46,078/70

[52] U.S. Cl. ..................... 74/469, 74/519, 74/522, 73/397
[51] Int. Cl. ............................................. G05f 1/00
[58] Field of Search ............... 73/397; 74/469, 470, 74/519, 522, 108

[56] References Cited
UNITED STATES PATENTS
2,141,464  12/1938  Gorrie............................. 74/469 X

*Primary Examiner*—James J. Gill
*Attorney*—Irvin S. Thompson and Robert J. Patch

[57] ABSTRACT

A vector force-balancing mechanism comprising a first rigid member connected to a frame for receiving an input force to be balanced, a second rigid member connected to the first member by a flexure strip for relative pivotal movement, and a third rigid member lockably pivotally mounted on the frame about an axis which is perpendicular to the plane of the relative movement and extends transversely through the flexure strip when the first and second rigid members are relatively angularly positioned so that the flexure strip is unstrained, the third rigid member being pivotally attached to the second member at a position remote from the axis.

2 Claims, 4 Drawing Figures

3,739,655

VECTOR FORCE-BALANCING MECHANISMS

SUMMARY OF THE INVENTION

This invention relates to vector force-balancing mechanisms as used, for example, in pressure monitoring instruments.

According to the present invention, a vector force-balancing mechanism comprises a frame, a first rigid member connected to said frame for receiving an input force to be balanced, a second rigid member, a flexure strip connecting together said two rigid members for relative pivotal movement, and a third rigid member lockably pivotally mounted on said frame about an axis which is perpendicular to the plane of said relative movement and extends transversely through said flexure strip when said first and second rigid members are relatively angularly positioned so that said flexure strip is unstrained, said third rigid member being pivotally attached to the second member at a position remote from said axis.

Varying of the relative positioning of the first and second members within a desired range to vary the ratio between the applied force and a balancing force is carried out by unlocking the third rigid member and rotating it to move the second member with respect to the first. The third member can then be locked when the relative positioning of the first and second members, i.e., the angle therebetween, is set to a new value.

With the mechanism of the invention, as is described in more detail below, the nature of the relative movement of the first and second rigid members approaches that which would be obtained if the members were connected by a hinge, i.e., there is a minimum of translational relative movement associated with the relative rotational movement and movement of the first rigid member with respect to the fixed reference in response to relative rotation of the first and second members is thus minimal. The ratio between the length of the flexure strip as measured in the plane of said relative movement, between the positions where it meets the first and second rigid members, and the spacing between the point where the flexure strip meets the first member and said axis when the flexure strip is unstrained, as measured in like manner, affects the extent of said minimal movement of the first member with respect to the frame of reference when the two members are relatively displaced. It has been found when such ratio is given the value 3:1 that such movement is minimized.

BRIEF DESCRIPTION OF THE DRAWINGS

The invention may be more readily understood from the following detailed description of an illustrative embodiment thereof, given by way of example only, and by reference to the accompanying drawings, in which.

DESCRIPTION OF THE PREFERRED EMBODIMENT

Figure 1:
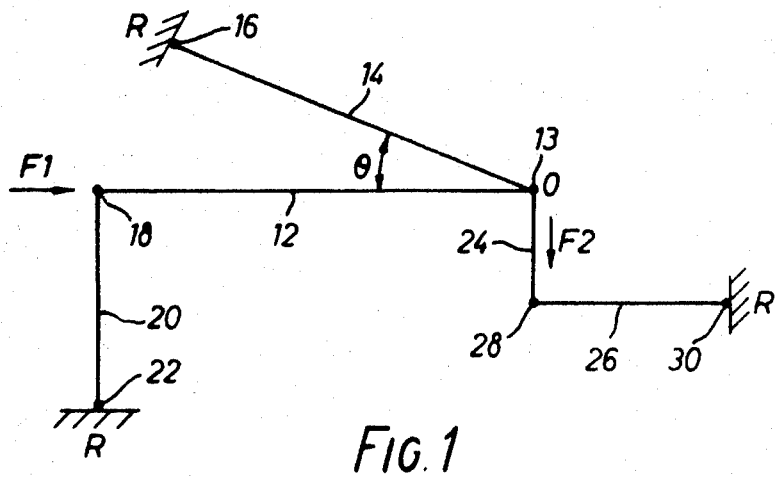
FIG. 1 is a schematic view of a vector force-balancing mechanism.

A vector mechanism for balancing an applied force $F_1$ and a balancing force $F_2$ so that $F_2 = F_1 \tan \theta$ is shown in FIG. 1. The mechanism comprises a first rigid member or main beam 12 and a second rigid member or elevating beam 14, the two members being pivotally connected together at 13 about an axis normal to the plane of the drawing and shown as O. The elevating beam 14 is pivotally connected at 16 to a fixed frame shown schematically as R. The main beam 12 is pivotally connected at 18 to the frame R via a member 20 and a further pivotal connection 22, and is also connected to the frame R via members 24, 26 and further pivotal connections 28, 30.

The vector mechanism is arranged so that the angle $\theta$ between the main beam 12 and the elevating beam 14 may be varied over a given range so that the ratio between the balancing force $F_2$ and the applied force $F_1$ may be correspondingly varied. It is necessary that the members 20, 24 and 26 do not move as $\theta$ is varied, i.e., that the main beam 12 does not move by more than a negligible amount. This can be catered for by arranging for the pivotal connection 16 to be adjustable with respect to the frame R over the arc of a circle centered at O.

Figure 2:
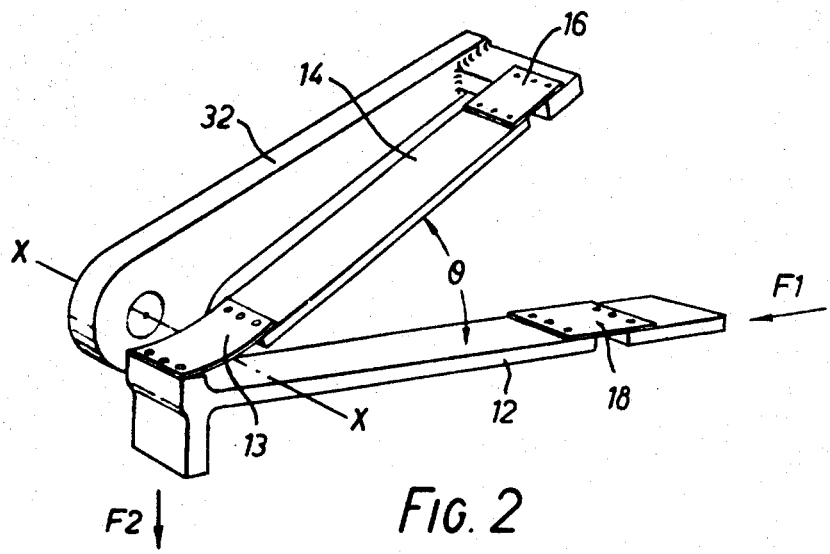
FIG. 2 is a perspective view of a vector force-balancing mechanism embodying the present invention.
Figure 3:
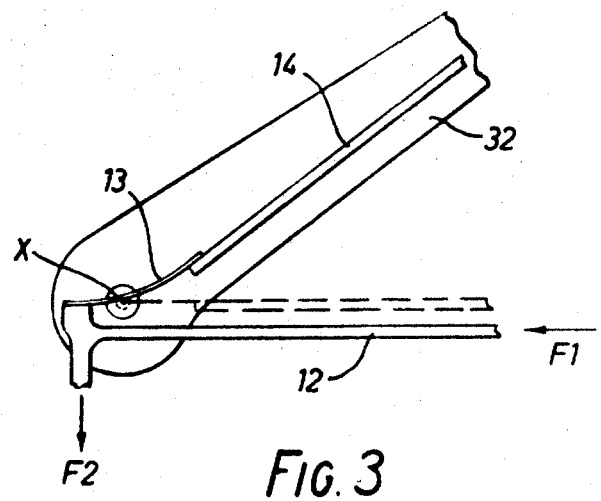
FIG. 3 is a side view of a part of the mechanism shown in FIG. 2.
Figure 4:
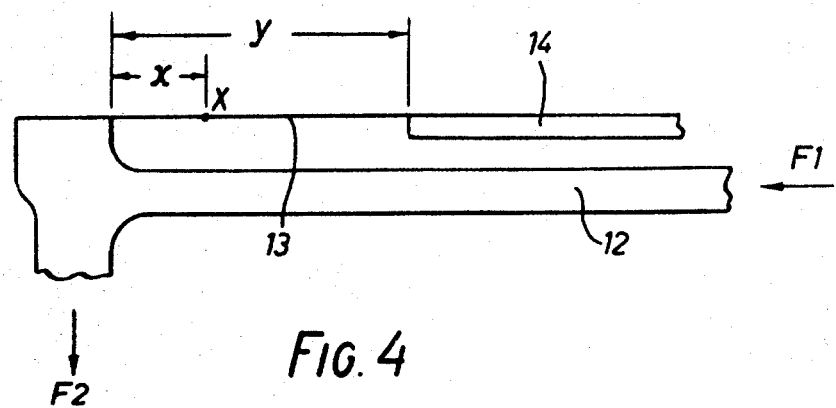
FIG. 4 is a part of the view of FIG. 3 on an enlarged scale.

A preferred embodiment of the present invention is shown in FIGS. 2, 3 and 4. In these figures, where appropriate, the reference numerals used are the same as those used for corresponding elements shown schematically in FIG. 1. The pivotal interconnections 13, 16, 18 are flexure strips which may be made of thin, elastic metal. Flexure strips are used because hinge joints are generally unsatisfactory in very light mechanisms due to the inaccuracies caused by hysterisis and friction. To accomplish the required connection via pivotal interconnection 16 to the frame R, the interconnection 16 is made to a third rigid member, a so-called locking arm 32, which is lockably pivotally mounted to the frame R about an axis X—X which is normal to the plane of relative movement of the beams 12 and 14. To adjust the angle $\theta$, the locking arm 32 is unlocked, the beams 12 and 14 are pivoted to a desired relative position and the arm 32 is then locked again.

As mentioned above, it is important that the main beam 12 does not move by more than a negligible amount when the angle $\theta$ is varied. To ensure this, it will be apparent that the axis X—X of the locking bar 32 must coincide as far as possible with the axis O of the pivotal interconnection 13. However, with a flexure strip, there is no well-defined pivotal axis. Nevertheless, movement of the main beam during adjustment of the angle $\theta$ is minimized in the present invention by arranging for the axis X—X to extend transversely through the flexure strip 13 when it is unstrained. This may readily be seen from FIG. 3 where the unstrained position of the flexure strip 13 and of the elevating beam 14 are shown in dotted lines.

Movement of the main beam 12 can be further minimized by suitably choosing the ratio between the length of the flexure strip 13 as measured between the points where it meets the main beam 12 and the elevating beam 14, i.e., the dimension $y$ in FIG. 4, and the spacing between the point where the flexure strip 13 meets the main beam 12 and the axis X—X, when the strip 13 is unstrained, i.e., the dimension $x$ in FIG. 4. It has been found that movement of the main beam is minimal when this ratio is 3:1. With such an arrangement, in a vector mechanism where the dimension $y$ of the strip 13 was about 0.25 inches, the main beam movement was observed to be only about one ten thousandth of an inch (0.0001 inches) for a change in θ of 30°.

The invention may be embodied in other forms than that shown in FIGS. 2, 3 and 4. For example, the unstrained position of the flexure strip 13 is desirably arranged to occur at the mean value of θ, which may be other than zero as in the embodiment shown here.

It will thus be seen from the foregoing disclosure that the present invention provides a vector mechanism which employs flexure strips whilst minimizing the attendant disadvantage while main beam movement.

I claim:

1. A vector force balancing mechanism comprising a first rigid member adapted to be connected to a frame for receiving an input force to be balanced, a second rigid member, a flexure strip connecting together said two rigid members for relative pivotal movement, and a third rigid member adapted to be lockably pivotally mounted on said frame about an axis which is perpendicular to the plane of said relative movement and extends transversely through said flexure strip when said first and second rigid members are relatively angularly positioned so that said flexure strip is unstrained, said third rigid member being pivotally attached to the second member at a position remote from said axis.

2. A vector force-balancing mechanism as claimed in claim 1, wherein the ratio between the length of the flexure strip between the points where it meets said first and second rigid members and the spacing between the positions where said flexure strip meets said first rigid member and where said strip is intersected by said axis, each measured in said plane of relative movement, is 3:1.

* * * * *